United States Patent [19]

Dissett et al.

[11] Patent Number: 4,557,158

[45] Date of Patent: Dec. 10, 1985

[54] HOLDOUT RING CONSTRUCTION FOR DIFFERENTIALS

[75] Inventors: Walter L. Dissett, Southfield; James R. Bawks, St. Clair Shores, both of Mich.

[73] Assignee: Tractech, Inc., Warren, Mich.

[21] Appl. No.: 496,095

[22] Filed: May 10, 1983

[51] Int. Cl.$^4$ .......................................... F16H 35/04
[52] U.S. Cl. ................................................... 74/650
[58] Field of Search ................... 74/650, 710, 665 T, 74/710.5, 711

[56] References Cited

U.S. PATENT DOCUMENTS

| | | | |
|---|---|---|---|
| 2,638,794 | 5/1953 | Knoblock | 74/650 |
| 2,667,008 | 1/1954 | Myers | 74/650 |
| 2,667,087 | 1/1954 | Myers | 74/650 |
| 2,830,466 | 4/1958 | Myers | 74/650 |
| 3,397,593 | 4/1966 | Knoblock | 74/650 |
| 3,451,496 | 6/1969 | Myers | 74/650 X |
| 3,791,238 | 2/1974 | Bokovoy | 74/650 |
| 4,159,656 | 7/1979 | Tomich | 74/650 |
| 4,400,996 | 8/1983 | Schou | 74/650 |
| 4,424,725 | 1/1984 | Bawks | 74/650 |

Primary Examiner—Leslie A. Braun
Assistant Examiner—Stephen B. Andrews
Attorney, Agent, or Firm—Laubscher & Laubscher

[57] ABSTRACT

A differential mechanism is disclosed including a pair of holdout rings each of which is angularly displaceable to an operable position for maintaining in a disengaged condition an associated overrunning or underrunning clutch member, characterized by the arrangement of the center cam member concentrically within the center driving member, together with the provision of a rotation limiting stop for limiting the extent of rotation of the holdout ring relative to the central driving member when the holdout ring is rotated from an inoperative condition toward an operative condition. In one embodiment, the stop comprises the side wall of a through slot (2e) contained in the inner periphery of the center driving member (2), which stop is engaged by the lateral surface (30e) of an axial projection (30c) of reduced width on the associated holdout ring lug (30b). In a second embodiment, each holdout ring lug (130b) has a generally rectangular configuration, and certain teeth (102m) on the center driving member have stepped teeth with portions of reduced height (102n) that extend radially inwardly between the slots, which reduced tooth portions have lateral surfaces that are engaged by the lugs (130b) to limit the extent of rotational displacement of each holdout ring relative to the central driving member. By providing the stop on the central driving member, a more accurate positioning of the holdout ring in the operative condition is achieved, thereby affording improved quality and reliability of the differential mechanism.

5 Claims, 18 Drawing Figures

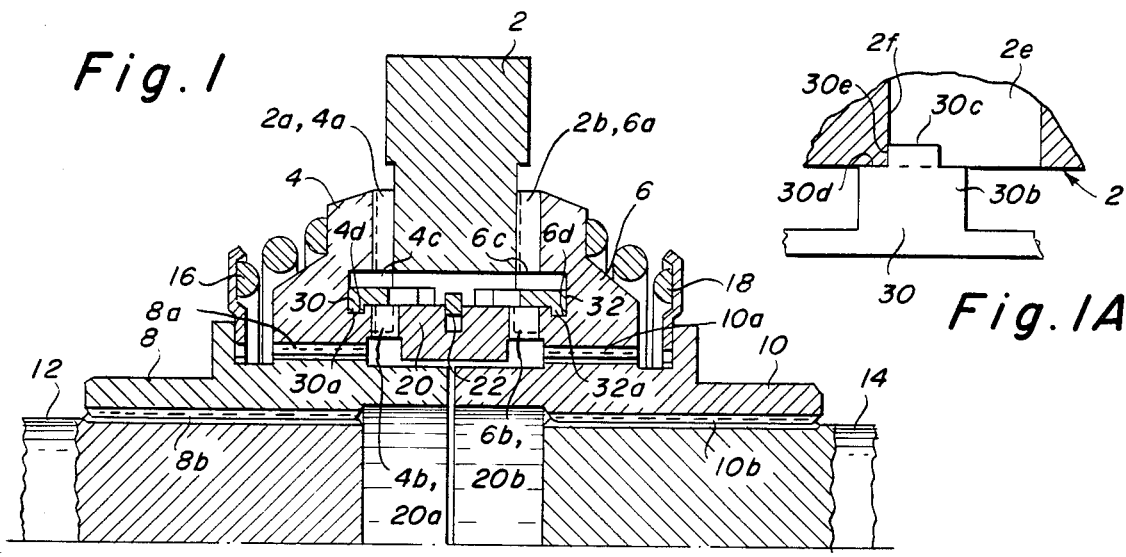
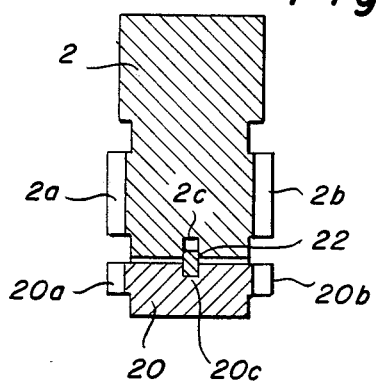
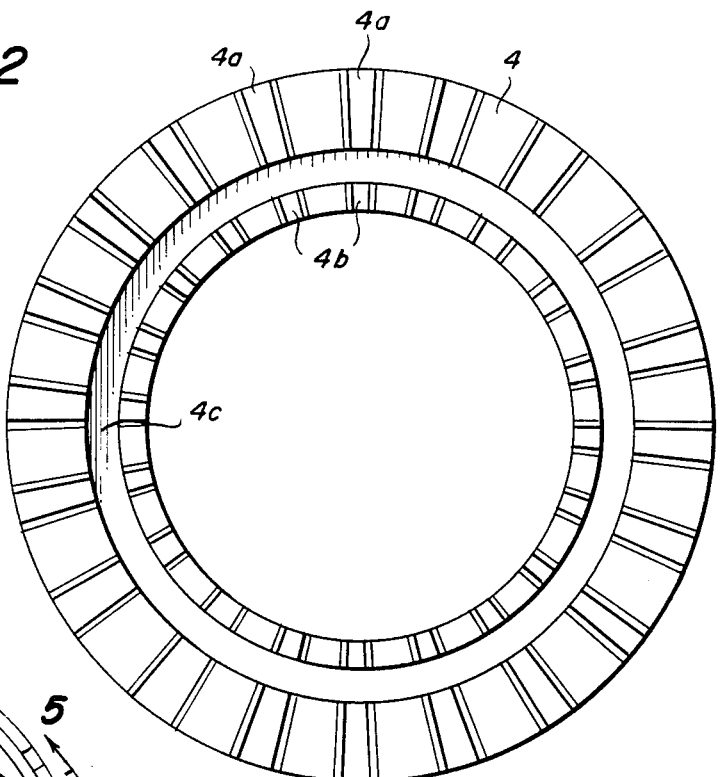
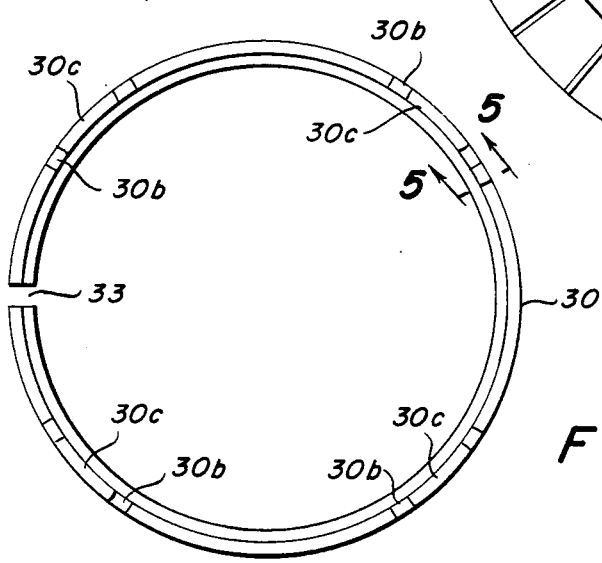

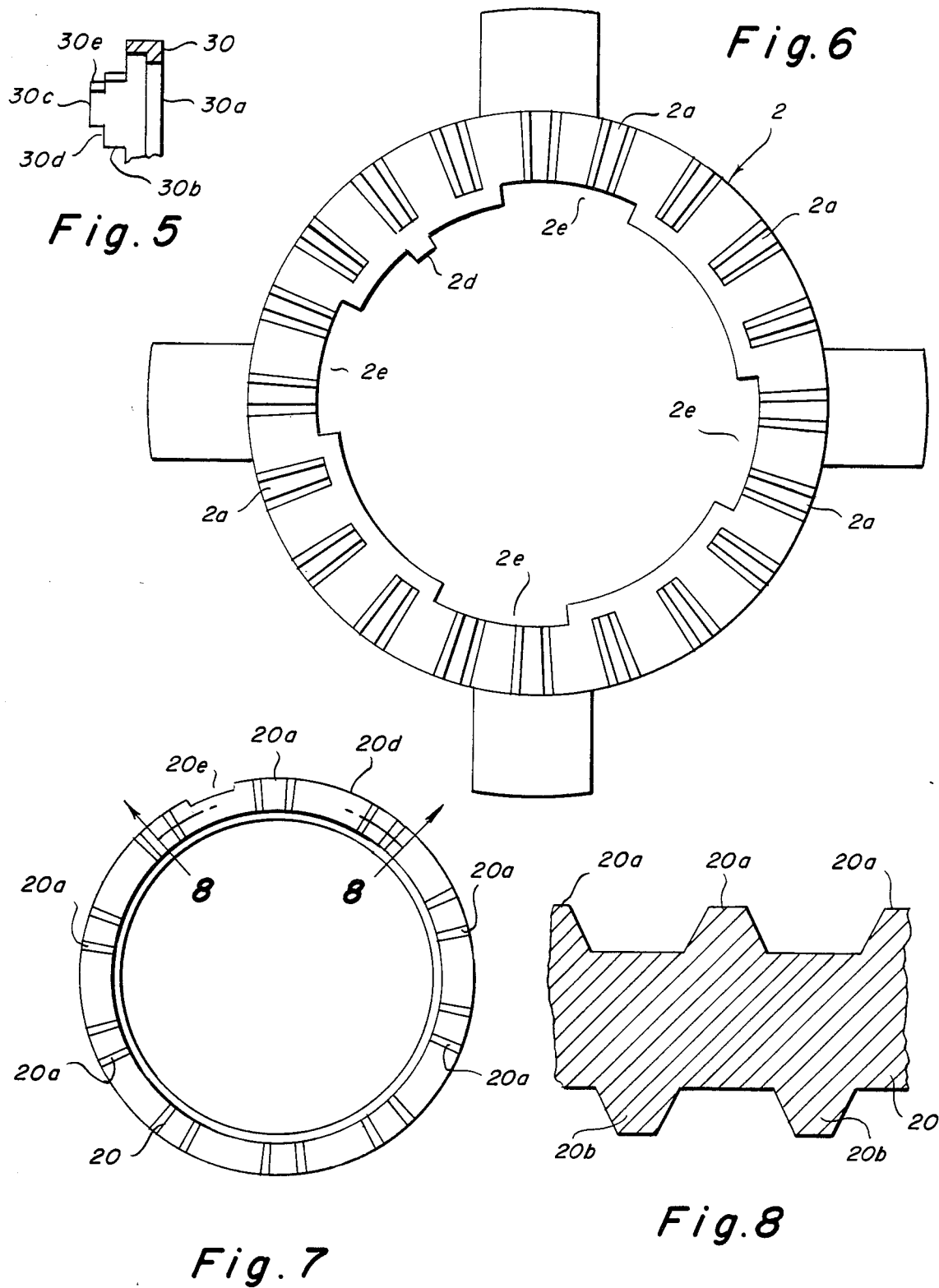

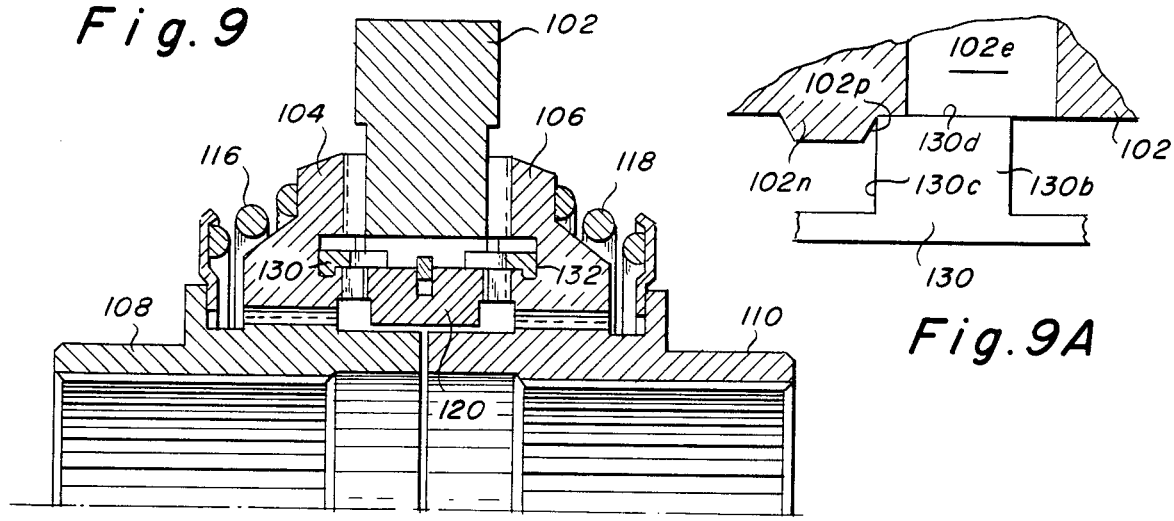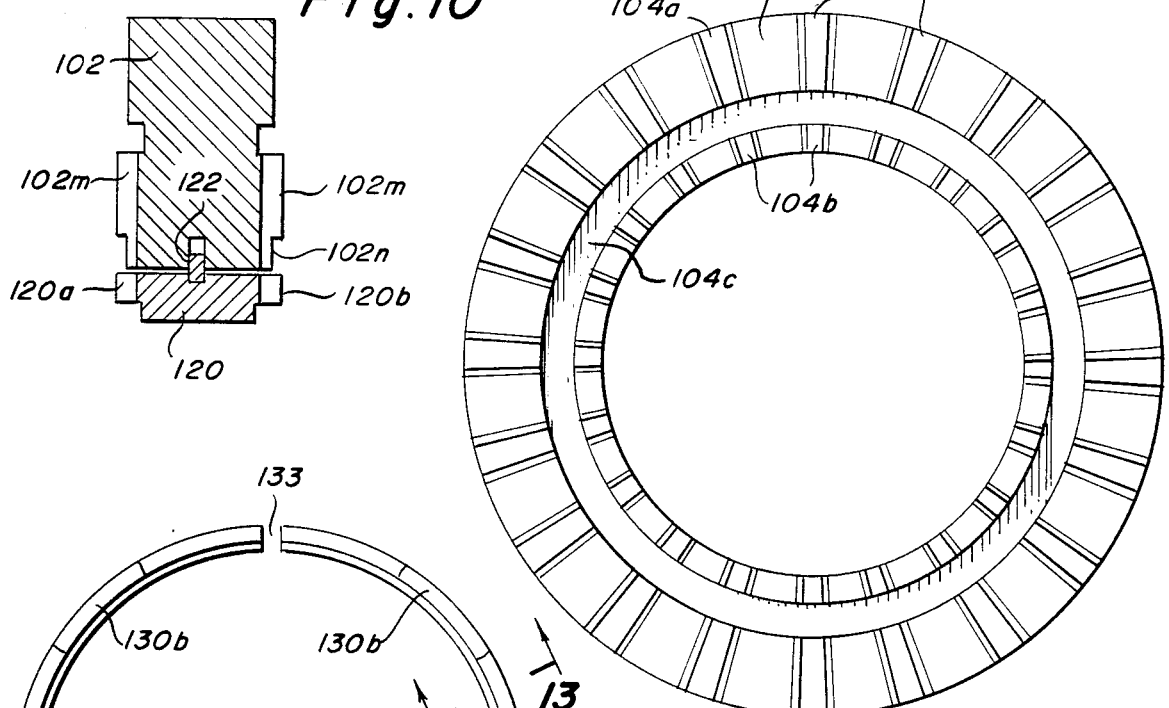

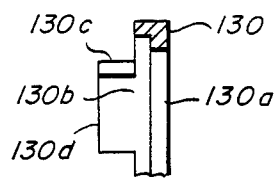
Fig. 13
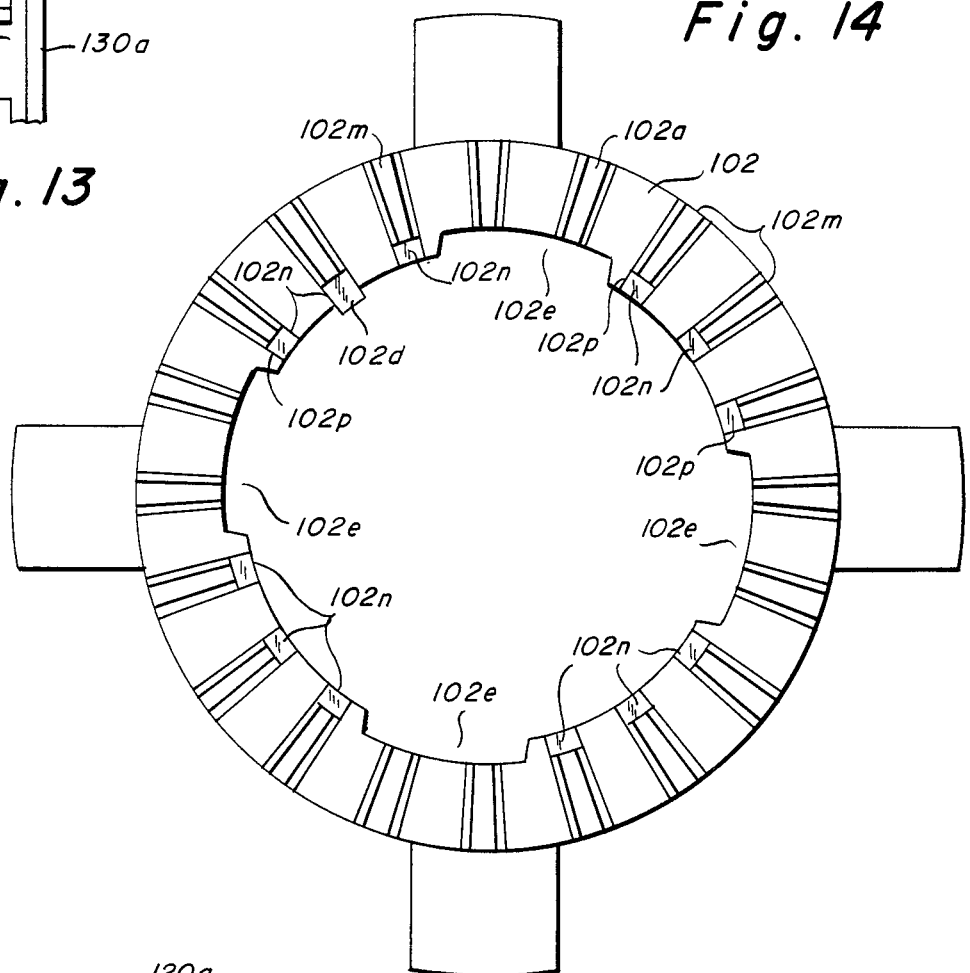
Fig. 14
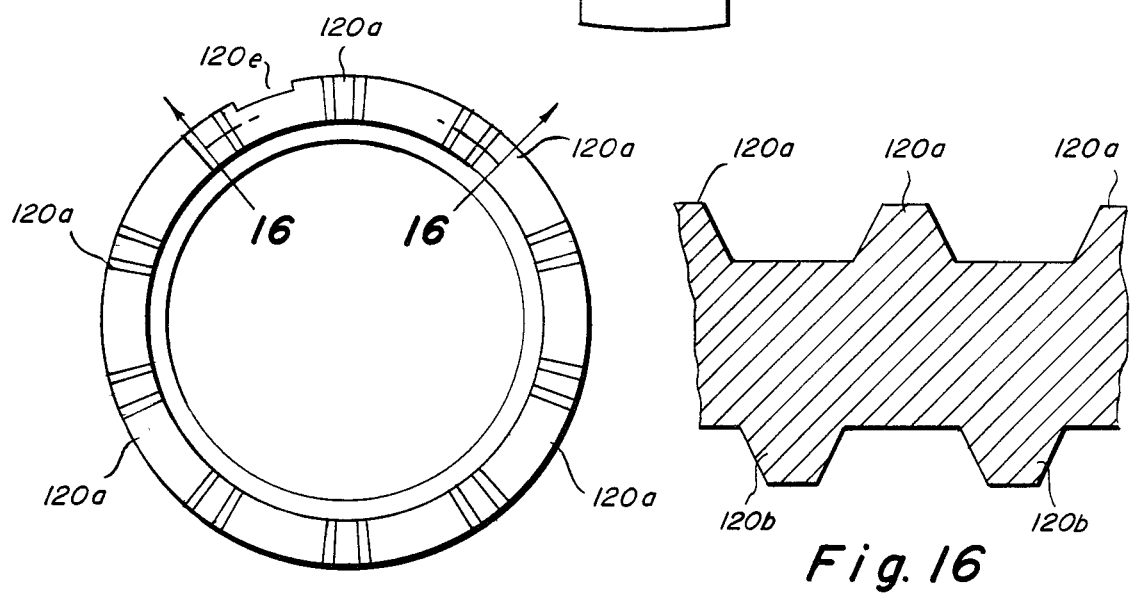
Fig. 15
Fig. 16

HOLDOUT RING CONSTRUCTION FOR DIFFERENTIALS

BRIEF DESCRIPTION OF THE PRIOR ART

Differential mechanisms of the holdout ring type are well known in the patented prior art, as evidenced, for example, by the patents to Knoblock Nos. 2,638,794 and 3,397,593, and Bokovoy No. 3,791,238. In such differentials, the driven clutch member associated with an overrunning driven shaft is cammed out to a disengaged condition relative to the center driving member, and a holdout ring is rotated from an inoperative to an operative position relative to the center driving member, thereby to maintain the overrunning clutch member in the disengaged condition. When the overrunning condition has terminated, the holdout ring is rotated in the opposite direction to an inoperative position in which the lugs are opposite the slots in the center driven member, whereupon the spring-biased clutch member is axially displaced toward its engaged position with the central driving member.

In these prior devices, means are provided for limiting the extent of rotational displacement of the holdout rings relative to the center driving member. In the patents to Knoblock No. 2,638,794 and Bokovoy No. 3,791,238, for example, an internal axial rib on the inner circumference of the annular center drive member extends into a corresponding through slot contained in the generally C-shaped holdout ring. The prior designs are relatively costly to manufacture, owing to the accurate machining required for many of the precision parts.

The present invention was developed to simplify the construction of the complex differential components, to afford faster assembly procedures with reduced secondary operations, and to increase the quality and reliability of the differential while reducing the manufacturing cost thereof.

SUMMARY OF THE INVENTION

Accordingly, a primary object of the invention is to provide a differential mechanism wherein the axial slots for the holdout ring lugs are formed in the inner peripheral surface of the annular central driving member, stop means being provided for limiting the extent of rotational displacement of each holdout ring relative to said central driving member when the holdout ring is in the operative condition.

In one embodiment, the rotation limiting stop means comprises a central axial projection of reduced width provided on each holdout ring lug, which projection is adapted to engage a side wall of the corresponding through slot when the associated overrunning clutch is disengaged and the holdout ring is rotated toward its operable position. In a second embodiment, the holdout ring lugs have a conventional rectangular configuration, the limiting means being defined by wall surfaces on portions of stepped teeth on the central driving member, which reduced portions extend radially inwardly between the axial slots.

According to a further object of the invention, by providing the holdout ring slots on the inner circumference of the center driving or spider member, the center cam member may be provided with a uniform outer cylindrical peripheral surface, and only secondary machining is required to define the snap ring peripheral groove formed therein. Only one half of the number of teeth are required, whereby a tooth can be arranged opposite a space, thereby providing better density control of the top of the teeth. The simplified design permits easier machining, and the straight side configuration of the cam teeth affords ease of machining and quality checking. The overall cost of the cam member of the present invention is greatly reduced relative to the center cams of the prior differential mechanisms.

Similarly, the center driving member is more easily and economically produced, since the entire internal configuration can be broached, resulting in consistent surfaces for use as locators for milling the torque or driving teeth. The improved construction offers better control of the distance between the holdout ring lug extremities relative to the working face of the center driving member, resulting in improved consistency of the clutch to spider kiss when the associated driven clutch member is cammed out to the disengaged condition.

The improved differential permits considerable variation in the size and location of the axial slot in the split C-shaped resilient holdout ring. By omitting the locator function from the holdout ring slot, the only function of the slot is to permit radial expansion of the ring at the time of its connection in the corresponding slot of the associated driven clutch member.

BRIEF DESCRIPTION OF THE DRAWINGS

Other objects and advantages of the invention will become apparent from a study of the following specification when viewed in the light of the accompanying drawing, in which:

FIG. 1 is a detailed longitudinal sectional view of a first embodiment of the differential mechanism of the present invention, and FIG. 1A is a detailed view illustrating the holdout operation of this embodiment;

FIG. 2 is a detailed axial sectional view illustrating the snap-ring connection between the center cam and center driving members of FIG. 1;

FIG. 3 is an end view of one of the driven clutch members of FIG. 1;

FIG. 4 is an end view of one of the holdout rings of FIG. 1;

FIG. 5 is a sectional view taken along line 5—5 of FIG. 4;

FIG. 6 is an end view of the center driving member;

FIG. 7 is an end view of the center cam member of FIG. 1;

FIG. 8 is a sectional view taken along line 8—8 of FIG. 7;

FIG. 9 is a detailed longitudinal sectional view of a second embodiment of the invention, and FIG. 9A is a detailed view illustrating the holdout operation of this embodiment;

FIG. 10 is a detailed axial sectional view illustrating the snap-ring connection between the center cam and center driving members of FIG. 9;

FIGS. 11 and 12 are end views of the driven clutch and holdout ring members of FIG. 9;

FIG. 13 is a sectional view taken along line 13—13 of FIG. 12;

FIGS. 14 and 15 are end view of the center driving and center cam members of FIG. 9; and FIG. 16 is a sectional view taken along line 16—16 of FIG. 15.

DETAILED DESCRIPTION

Referring first more particularly to FIG. 1, the differential mechanism includes an annular center driving or spider member 2 that is arranged between a pair of annular driven clutch members 4 and 6 that are internally splined for non-rotatable axial sliding movement on the externally splined portions 8a and 10a of a pair of side gears 8 and 10, respectively. The side gears are non-rotatably connected by internal spline means 8b, 10b with a pair of colinearly arranged output shafts 12 and 14, respectively. The driven clutch members are biased together by externally arranged springs 16 and 18 to effect driving engagement between center driving teeth 2a and 2b on opposite ends of the driving member and clutch teeth 4a and 6a on the driven clutch members 4 and 6, respectively. Concentrically arranged within the driving member 2 is an annular center cam member 20 having at each end angularly staggered sets of cam teeth 20a, 20b (FIG. 2) that engage corresponding cam teeth 4b and 6b on the driven clutch members 4 and 6, respectively. The center cam member 20 is retained against axial movement relative to the driving member 2 by means of annular snap ring 22 (FIG. 2) that extends within the annular grooves 2c and 20c contained in the inner and outer peripheries of the driving and central cam members, respectively. The outer peripheral portions 20d of the center cam member also contains a first through notch 20e (FIG. 7) for an undersized key 2d (FIG. 6) contained on the inner periphery of the driving member, thereby permitting a limited angular adjustment of the central cam member 20 relative to the driving member 2.

Arranged colinearly between the driving member 2 and the driven clutch members 4 and 6 are a pair of identical rotatable resilient holdout rings 30 and 32, respectively. Each holdout ring is axially split by slot 33 (FIG. 4) to define a generally C-shaped configuration. The remote ends of the rings are rotatably mounted within corresponding recesses 4c and 6c, respectively. The holdout rings include radially inwardly directed annular flanges 30a and 32a, respectively, that extend radially inwardly within corresponding annular grooves 4d and 6d contained in the inner side walls of recesses 4c and 6c, respectively, thereby preventing axial movement of the holdout rings relative to the driven clutch members 4 and 6, respectively.

The resilient holdout rings are normally biased radially inwardly toward a contracted condition in frictional engagement with the inner walls of the recesses. The holdout rings are provided at their adjacent ends with axially extending circumferentially arranged lugs (for example, the lugs 30b on holdout ring 30, as shown in FIG. 4), that normally extend within corresponding second peripherally spaced slots 2e (FIG. 1A) contained in the inner peripheral surface of the central driving member 2.

In accordance with a characterizing feature of the present invention, means are provided for limiting the extent of rotational movement of each holdout ring relative to the central drive member when the associated driven clutch member is in an overrunning or underrunning disengaged, cammed-out condition. To this end, the holdout ring lugs 30b are of a stepped configuration including at their extremities axially extending centrally arranged projecting portions 30c. As shown in FIG. 1A, dimensions of the lugs are such that when the lug end extremity 30d engages the adjacent end surface of the center driving member, the longitudinal side surface 30e of the lug projecting portion 30c will engage the adjacent side wall 2f of the corresponding slot, thereby limiting further angular displacement of the holdout ring relative to the center driving member.

OPERATION

In normal operation, driving member 2 drives output shafts 12 and 14 at the same rotational velocity via center drive teeth 2a, teeth 4a of driven clutch member 4, spline teeth 8a, side gear 8 and spline teeth 8b, and via center driven teeth 2b, clutch teeth 6a of driven clutch teeth 10a, side gear 10 and spline teeth 10b, respectively.

Assume now that driven shaft 12 overruns driven shaft 14. Owing to the climb-out camming action between cam teeth 20a on the central cam member 20 and corresponding cam teeth 4b on the driven clutch member 4, the driven clutch member 4 is shifted to the left against the force of spring 16 to disengage driven clutch teeth 4a from the center driving teeth 2a of the central driving member 2. Owing to the connection afforded by inwardly directed flange 30a, holdout ring 30 is also shifted to the left, and, owing to the frictional drag between the holdout ring 30 and driven clutch member 4, is rotated slightly to the position of FIG. 1A (with the end face 30d of lug 30b in engagement with the adjacent end face of center driving member 2) until one longitudinal side edge 30e of the central projection 30c engages the corresponding side wall 2f of slot 2e in center driving member 2, thereby to limit further rotation of the holdout ring relative to the center driving member 2.

As the rotational velocity of the overrunning output shaft 12 is returned to that of shaft 14, the frictional engagement between holdout ring 30 and driven clutch member 4 causes holdout ring 30 to be angularly displaced in the opposite direction relative to the center cam member 20, and when the holdout lugs 30b are returned to positions opposite the slots 2e, the driven clutch member 4 is shifted to the right by spring 16 to effect re-engagement between center driving teeth 2a and driven clutch teeth 4a. The output shafts 12 and 14 are now driven at the same rotational velocity by the driving member 2. Upon overrunning or underrunning of output shaft 14 relative to shaft 12, clutch member 6 is similarly shifted to the right and maintained in the disengaged position by holdout ring 32.

As shown in FIGS. 7 and 8, the camming teeth 20a, 20b of the center cam member have straight sides, thereby simplifying the ease of machining and inspecting these teeth. Only secondary machining is required for the snap ring groove 20c, and only one-half the number of teeth are required, so that a tooth can be opposite a space, making for better density control of the top of the teeth. An easier design is afforded for complete machining of the component, together with an overall cost reduction.

Regarding the manufacture of center driving member 2, the entire internal configuration can be broached, resulting in consistant surfaces to be used as locators for milling the torque teeth 2a, 2b. The improved construction affords better control of the distance between the holdout ring lug extremities relative to the working face of the center driving member, resulting in improved consistancy of the clutch to spider kiss when cammed out. The shorter torque teeth results in a shorter required milling time.

The size and location of slot 33 in holdout ring 30 (and the corresponding slot in holdout ring 32) can vary considerably, since the only function of this slot is to allow the ring to be expanded during insertion within the corresponding slot contained in the associated driven clutch members 4 and 6, respectively.

Referring now to the modification of FIGS. 9–16, the holdout ring lugs have a generally rectangular configuration, as shown by the lugs 130b in FIGS. 12 and 13. This modification is characterized in that the teeth 102m (FIG. 14) on the center driving member 102 which are not radially aligned with the slots 102e have stepped portions 102n (FIG. 9A) of reduced height that extend radially inwardly toward the internal circumferential surface of the center driving member 102. The length of each stepped portion 102n preferably equals the depth d of the slots 102e. These stepped tooth portions 102n define lateral stop shoulders 102p against which the longitudinal side surfaces 130c of the lugs 130b abut (FIG. 9A) when the corresponding driven clutch member is cammed-out to its disengaged condition and the holdout ring is rotated by frictional drag from the inoperative position to the operative position with the end surfaces 103d in of lugs 130b in engagement with the corresponding face of the center driving member 102, thereby limiting the degree of angular displacement of the holdout ring relative to the center driving member.

Thus, the main objectives have been met of simplifying the complex components, ease of manufacture, faster assembly with reduced secondary operations, better quality and reliability of the product, and lower cost.

While in accordance with the provisions of the Patent Statutes the preferred forms and embodiments have been illustrated and described, other changes and variations may be made without deviating from the inventive concepts set forth above.

What is claimed is:

1. Differential apparatus for driving a pair of colinearly-arranged output shafts (12,14) from an input driving shaft, comprising
   (a) an annular center driving member (2) arranged in concentrically spaced relation about the adjacent ends of said output shafts, said center driving member containing on its inner peripheral surface a plurality of circumferentially spaced through slots (2e, 102e);
   (b) a pair of side gears (8,10) connected with the adjacent ends of said output shafts, respectively;
   (c) clutch means normally connecting said center driving member with said side gears, said clutch means including a pair of annular clutch members (4,6) mounted for axial displacement on said side gears on opposite sides of said center driving member, respectively, said clutch members being spring biased inwardly together toward engaged positions relative to said center driving member in which teeth on said clutch members are in engagement with corresponding teeth on said center driving member;
   (d) means operable when one output shaft overruns the other by a predetermined amount for axially disengaging the clutch member associated with the overrunning shaft from said center driving member, said disengaging means including
      (1) an annular center cam member (20,120) mounted for limited angular displacement concentrically within said center driving member;
      (2) said cam member having a substantially uniform outer cylindrical peripheral surface and including at each end a plurality of cam teeth (20a, 20b; 120a, 120b) the number of which is reduced relative to the number of teeth of the corresponding clutch member, the teeth (20a, 120a) at one end of said cam member being angularly staggered relative to the teeth at the other end thereof; and
   (e) holdout ring means for maintaining said overrunning clutch member in the disengaged condition as long as the output shaft associated therewith is in the overrunning condition; said holdout ring means including
      (1) a pair of annular holdout rings (30,32; 130, 132) arranged colinearly between said center driving member and said clutch members, respectively, said holdout rings being connected at their remote ends for angular displacement relative to the associated clutch member, respectively, said holdout rings having lugs (30b,32b; 130b,132b) normally extending within said center driving member slots, respectively; and
      (2) stop means (2f; 102n) on said center driving member for limiting the angular displacement of each of said holdout rings relative to said center driving member, respectively.

2. Apparatus as defined in claim 1, wherein said holdout ring means comprises a stepped portion on each holdout ring lug defining a centrally-arranged axially-extending projection (30c) of reduced width, said projection having a longitudinal surface adapted to engage the adjacent stop surface (2f) defined by the side wall surface of the corresponding slot (2e) when the holdout ring is in the operative position relative to the center driving member.

3. Apparatus as defined in claim 1, wherein each holdout ring lug (130b) is of generally rectangular configuration including a flat end surface;
   wherein said center driving member includes at each end a plurality of circumferentially spaced radially extending driving teeth;
   and further wherein said stop means are defined by stepped portions (102n) of reduced height on certain teeth of said center driving member that extend radially inwardly between the slots contained on the inner periphery of said center driving member, said stepped portions of reduced height including shoulder means against which a corresponding longitudinal surface of a lug abuts when the holdout ring is rotated to the operative position relative to said center driving member.

4. Apparatus as defined in claim 1, wherein the cam teeth (20a,20b; 120a,120b) of said center cam member have straight sides.

5. Apparatus as defined in claim 1, wherein the number of cam teeth at each end of said center cam member is one-half the number of teeth of the associated clutch member.

* * * * *